Feb. 8, 1966 T. B. ATANASOFF ETAL 3,233,720

SORTING CONVEYORS, ESPECIALLY FOR POSTAL SYSTEMS

Filed June 19, 1963 10 Sheets-Sheet 1

INVENTOR

BY Albert M Zalkind

ATTORNEY

SORTING CONVEYORS, ESPECIALLY FOR POSTAL SYSTEMS

Filed June 19, 1963 10 Sheets-Sheet 2

INVENTOR

BY

ATTORNEY

SORTING CONVEYORS, ESPECIALLY FOR POSTAL SYSTEMS

Filed June 19, 1963 10 Sheets-Sheet 3

INVENTOR

BY

ATTORNEY

INVENTOR

BY

ATTORNEY

INVENTOR.

BY

INVENTOR.

BY

SORTING CONVEYORS, ESPECIALLY FOR POSTAL SYSTEMS

Filed June 19, 1963 10 Sheets-Sheet 7

INVENTOR.

BY

INVENTOR

BY

ATTORNEY

INVENTOR

BY

ATTORNEY

SORTING CONVEYORS, ESPECIALLY FOR POSTAL SYSTEMS

Filed June 19, 1963 10 Sheets-Sheet 10

INVENTOR

BY

ATTORNEY

United States Patent Office 3,233,720
Patented Feb. 8, 1966

3,233,720
SORTING CONVEYORS, ESPECIALLY FOR POSTAL SYSTEMS

Theodore B. Atanasoff, Frederick, Stanley W. Kerkering, Rockville, and Gordon L. Morgret, Middletown, Md., assignors to Aerojet-General Corporation, El Monte, Calif.

Filed June 19, 1963, Ser. No. 288,928
17 Claims. (Cl. 198—38)

This invention relates to sorting conveyors of the type whereon bulk mail postal sacks, or parcel post packages, parcels, etc., are placed and discharged along the length of the conveyor in accordance with particular destinations; for example, states, cities, etc., to which such items are to be forwarded. The discharge at various stations along the length of the conveyor is under control of a programming system wherein one or more operators press the keys of respective keyboards in accordance with a certain destination code for each of the items thus placed on the conveyor. The conveyor may consist of a continuously moving belt or other type of conveyance, and the instrumentalities for removing items at predetermined points along the length of such belt have heretofore consisted of swinging paddles or other mechanisms which became operative at respective stations, depending on whether or not an item is to be removed, that is, diverted at such stations.

In general, many systems have been devised, particularly for use in large post offices, for automatic sorting of bulk mail or parcels in the manner generally described above.

The present invention constitutes an improvement, specifically, in prior art systems which have heretofore been limited to the handling of fairly regularly shaped objects, and objects of no greater than a particular size. Further, such prior art systems have, in operation, afforded damaging shock or impact to packages being diverted and were, therefore, inappropriate for fragile parcels. A further drawback of prior art systems is the waste in time occasioned by the fact that parcels were allocated the same amount of linear space on the conveying instrumentality, for example a belt, regardless of the actual length of such parcels. Thus, in a system of the conventional prior art, all parcels may be required to be placed on five-foot centers on the belt, even though the parcels be anywhere from six inches to five feet long. Obviously, where packages approached in length the distance between placement centers on the belt, great care was required in centering the package lengthwise with respect to the placement point, otherwise, it would not be properly diverted. In any event, it will be apparent that the length of package, that such a system could handle, was limited and that small packages wasted carrying space and thus, of course, also wasted running time.

The primary objects of the present invention are to overcome the drawbacks generally described above and a further object is to provide a conveyor mechanism having simple and rugged parts capable of standing up under prolonged and heavy wear and wherein worn out parts may be easily replaced without the need for completed removal or disassembly of the conveyor. Other objects and features of the invention will be apparent from the desciption to follow.

Briefly, the invention comprises a conveyor mechanism in the form of a belt which moves continuously from one or more operator stations to a number of selective diverting stations in combination with feed belts, which acting prior to the main belt, provide for a certain minimum spacing between parcels thereon. The main belt does not have any diverting elements, such as paddles, pushers or the like, but of itself effects a diverting or article removal function. Thus, the main belt is comprised of a plurality of tiltable members, such as slats which are pivotally joined by means of link elements in such a manner that any slat can tilt or rock on an axis which is in the median plane of the belt and normal thereto. The slats are of such dimension in the direction of belt movement as to be less than the expected corresponding dimension of articles carried on such belt. For example, a mail sack or package may take up the width of several such slats, the width of such slats being understood as the narrow dimension parallel to the tilting axis and in the direction of movement of the belt. The length of the slats is correspondingly understood to be the actual transverse width of the belt. Each of the slats carries an element which rides in a track centrally disposed with respect to the slat and in the median plane thereof and such track is provided with mechanically operable switches, actuated by solenoids, whereby any element or series of elements connected to respective slats can be rocked by switching such elements from a track in the median plane to either of the two tracks parallel to the median track, but displaced transversely and at a higher level. Accordingly, as each such actuating element is switched in either direction to an off-center track, it causes tilting or slanting of the respective slat and a series of such slats arriving at an actuated switch would each in turn be individually and gradually tilted from its initial horizontal position to a position of some 30 degrees of slant, or sufficient to cause transverse sliding of a carried package. Thus, assuming a package rests on four slats, to be discharged onto a secondary chute or conveyor, a solenoid actuated track switch would be disposed with reference to such secondary conveyor as to effect tilting of each slat individually, beginning at the time that the first slat on which the package rested arrived at the upstream side of such secondary conveyor, which latter conveyor will be understood to be generally transversely disposed of the main conveyor. By the time such first slat had reached approximately half way of the width of such secondary conveyor, it would be fully tilted to the extent provided by the off-center tracks and the slats trailing such slat would be experiencing gradual tilt up to the point of full tilt, precisely as was experienced by the first slat. Accordingly, the package supported on the four slats would experience a gradual increasing gravitation force thereon beginning at its front or downstream end and commences to slide onto the secondary conveyor. As the fourth slat reaches its full tilt in passing the secondary conveyor station, the package becomes fully discharged onto the secondary conveyor. By effecting such a gradual application of gravitational force, the package is very gently handled in being thus diverted. Note that no thrust or push member has been applied to the package whatsoever and its length is theoretically unlimited, since it may rest on any number of slats along the length of the main conveyor. It is, of course, understood that package length is limited by transverse width of secondary conveyors where secondary conveyors are used. However, such limitation is eliminated where packages are allowed to merely slide from the slats onto a large platform. It should further be noted that the track switch remains in slat tilting condition so that all slats which follow the package carrying slats are likewise tilted; however, the control system enables the track switch to resume central position so that slats following any particular package supporting slats will remain horizontal where they in turn support a package to be diverted at some other point downstream of the diverting station described above.

From the above description, it will be apparent that the conveyor of the invention can handle packages and parcels of irregular size, of extreme length, and in a reasonably gentle manner, and that packages may be loaded onto the belt one after the other, there being as a practical matter one slat left between each group of package supporting slats so as to avoid any possible interference between packages. Assurance of such single slat spacing between packages is brought about by a series of spacing belts or conveyors on which the parcels are initially loaded and which are provided with progressively varying speeds under automatic control to ensure a spacing between the rear of one package and the front of another, of at least the width of one slat.

The control system is relatively simple in nature considering the versatility of the apparatus. Thus, programming may be effected by operators standing at conventional and commercially obtainable keyboards and there is no problem of package placement at spaced distances, nor any need to record package length. By the arrangement wherein all slats following the initial load bearing slat are tilted provided they carry no load, the need for recording package length, predetermining the number of slats that will tilt, is eliminated.

The belt, as mentioned above, is fully articulated by means of link elements pivoted to each other and each such link element carries a pivotally mounted slat, such pivotal mounting being effected by a pin passing through the slat support element which is normally maintained in the vertical plane, except when tilting the slat to one side or the other. The entire belt is carried between a pair of sprockets, one of which is powered to effect drive and the other being an idler, such sprockets being at the belt ends. The individual links are provided with rollers supported in tracks or channels carried on the frame of the conveyor, which may be comprised of angle iron. Thus, a conveyor comprised of a very large number of slats may be constructed in a relatively simple and economic manner.

A detailed description of the invention now follows, in conjunction with the appended drawing, in which.

Figures 1, 2, 3:
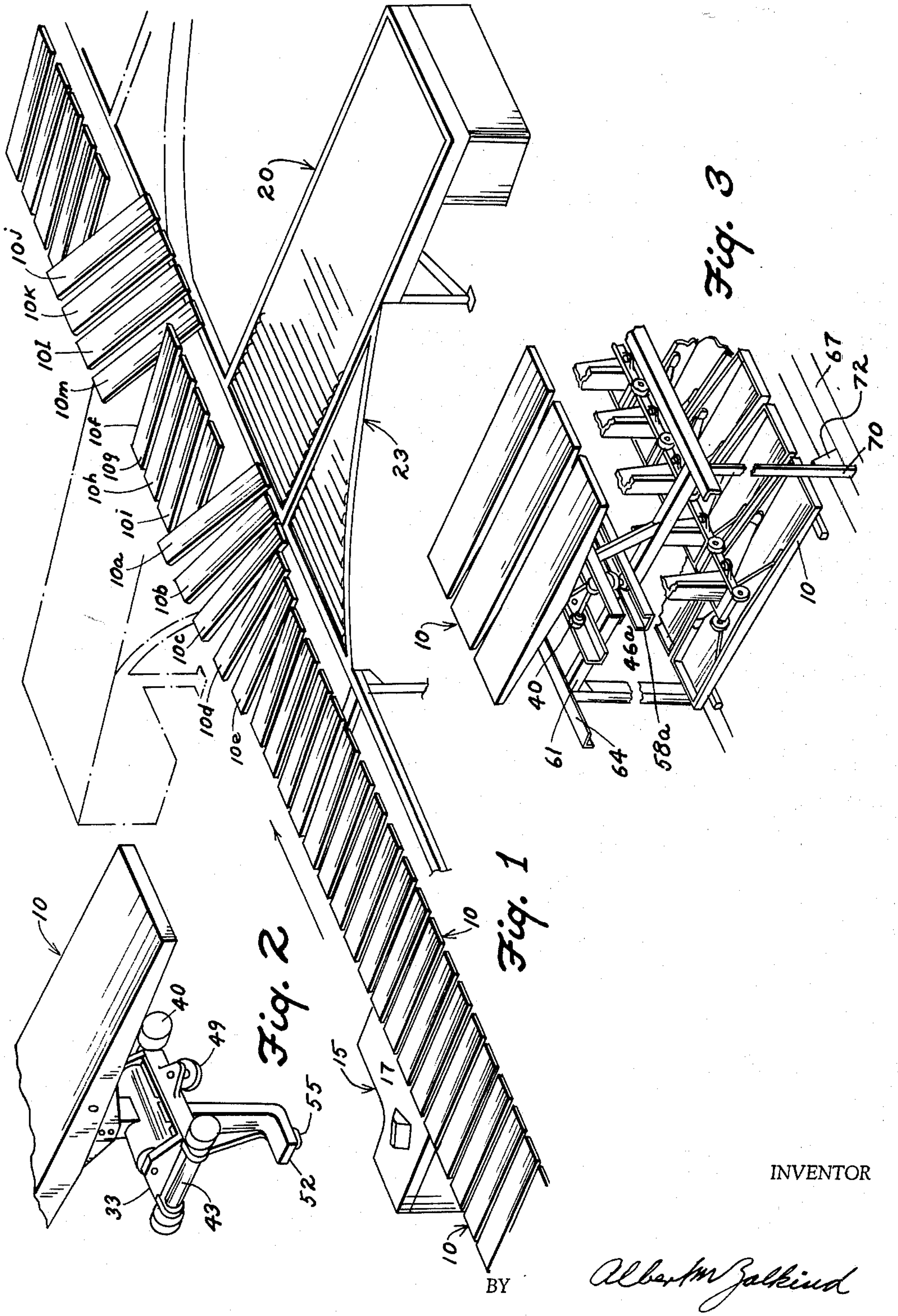
FIG. 1 is a perspective showing a fragment of a slat conveyor belt for purposes of illustrating the tilting of the slats in conjunction with a diverting station.
FIG. 2 is a perspective showing the components which support an individual slat.
FIG. 3 is a fragmentary perspective of a portion of the conveyor showing supporting framework and other features.
Figures 6, 7:
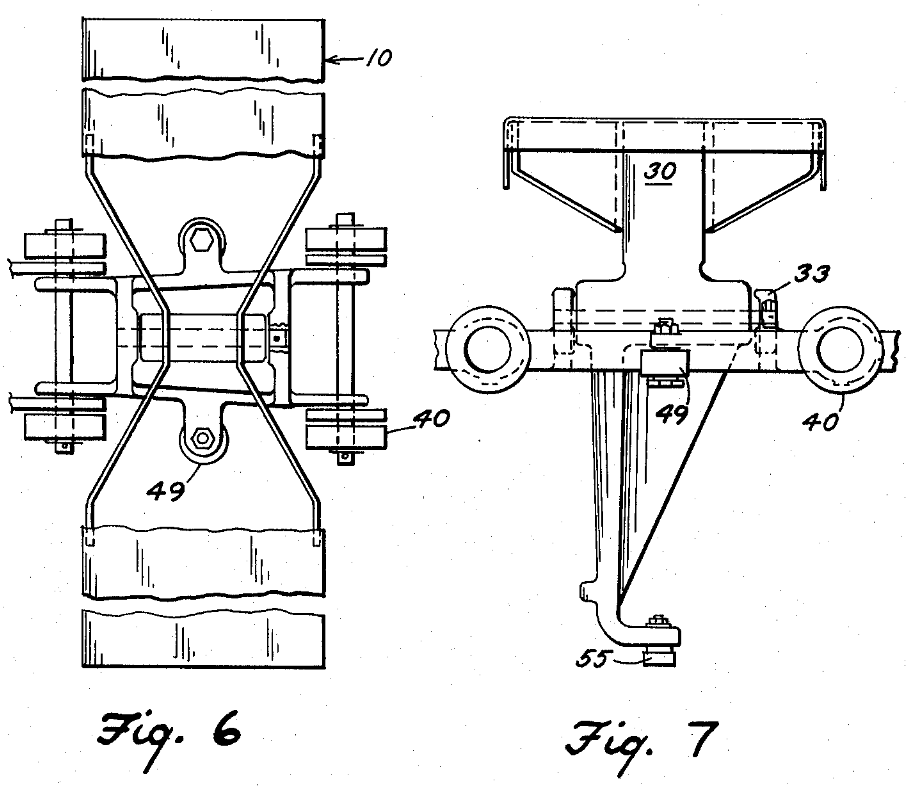
FIG. 6 is a plan view looking through a slat broken away to disclose various support details.
FIG. 7 is an elevation of FIG. 6.
Figure 13:
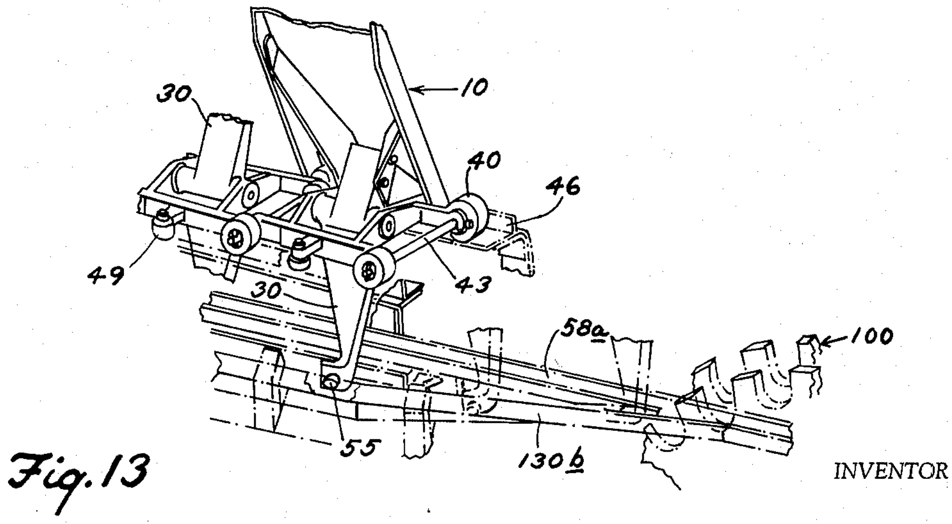
Figure 14:
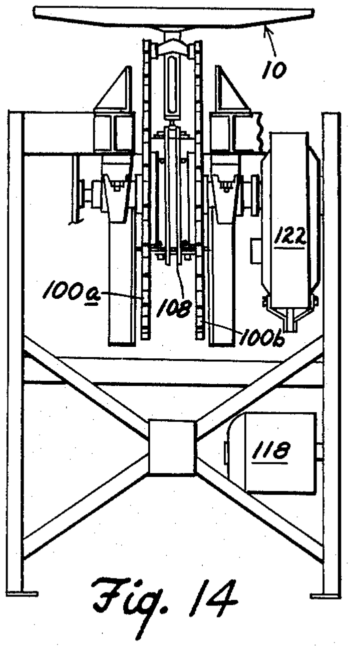
Figure 15:
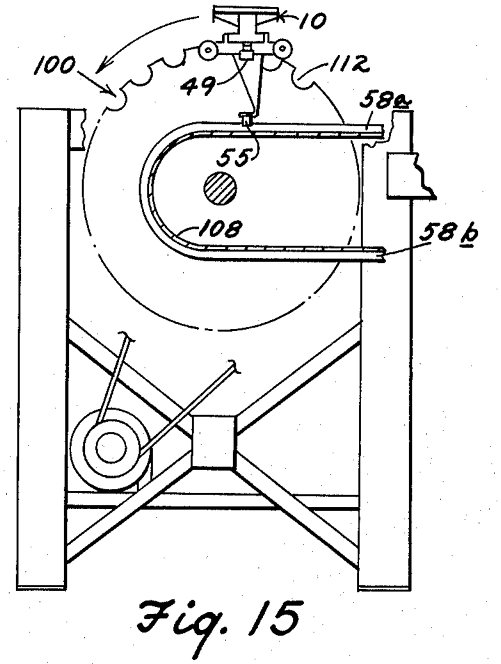
Figure 12A:
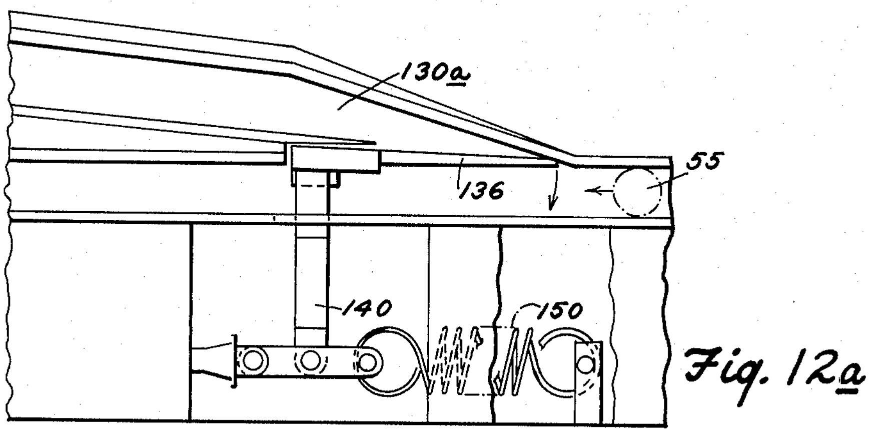
Figure 12B:
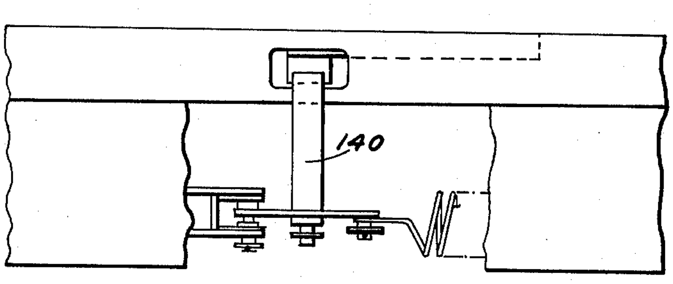
Figure 17:
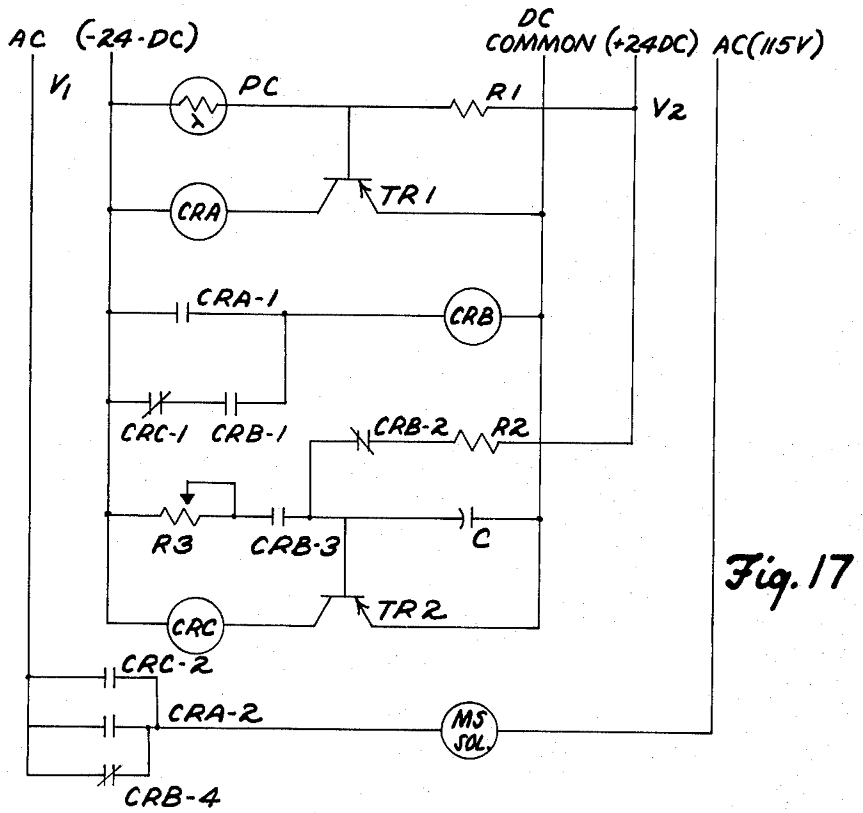
Figure 16:
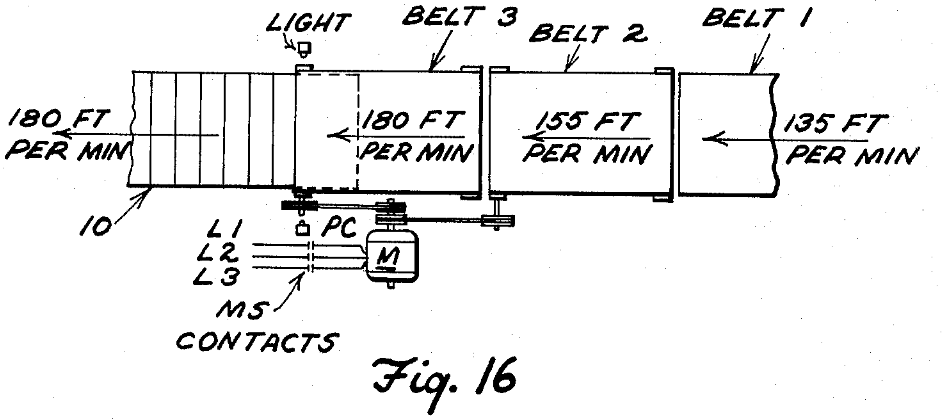
Figures 1, 18:
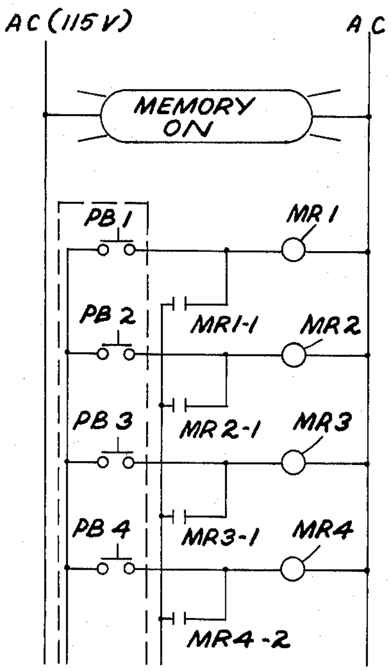
Figures 2, 18:
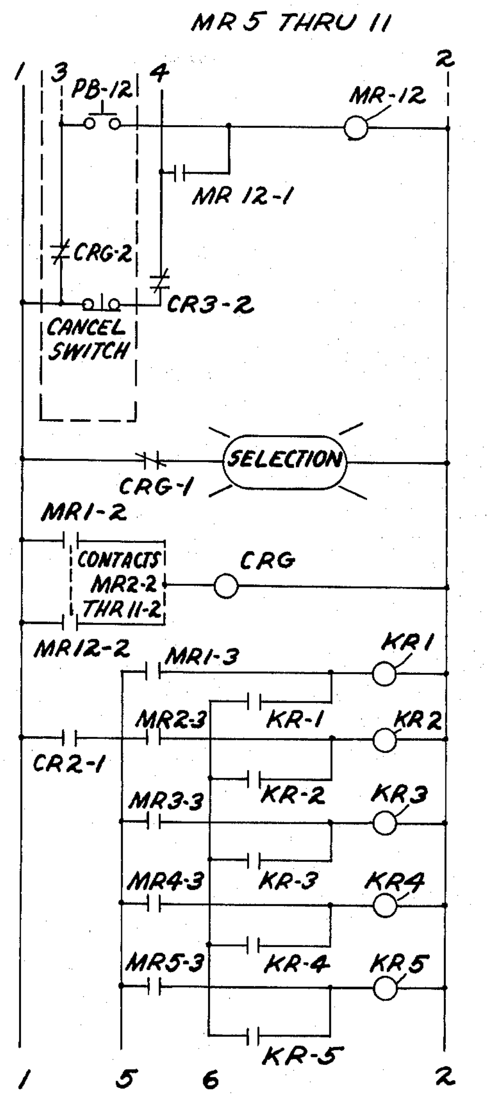
Figure 18:
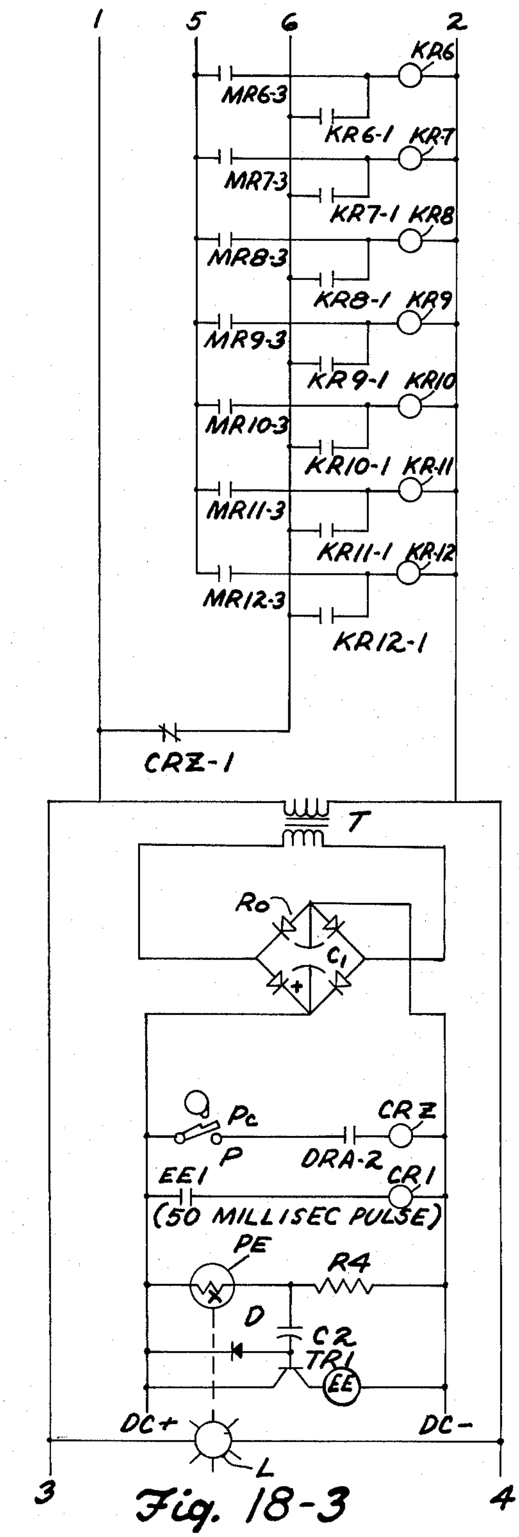
Figure 4:
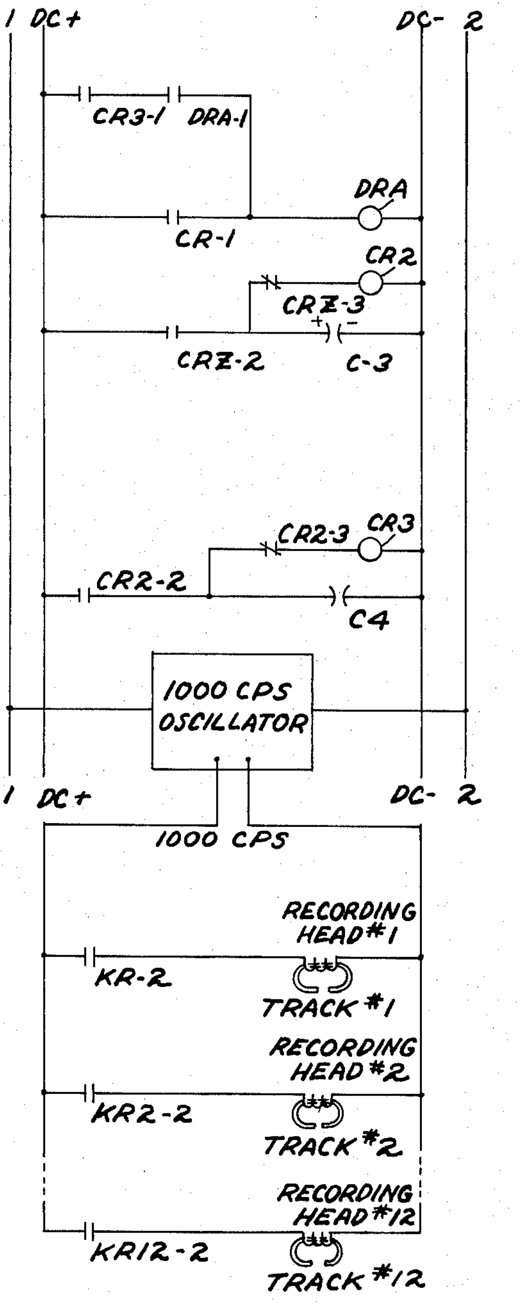
Figures 5, 6, 18, 19:
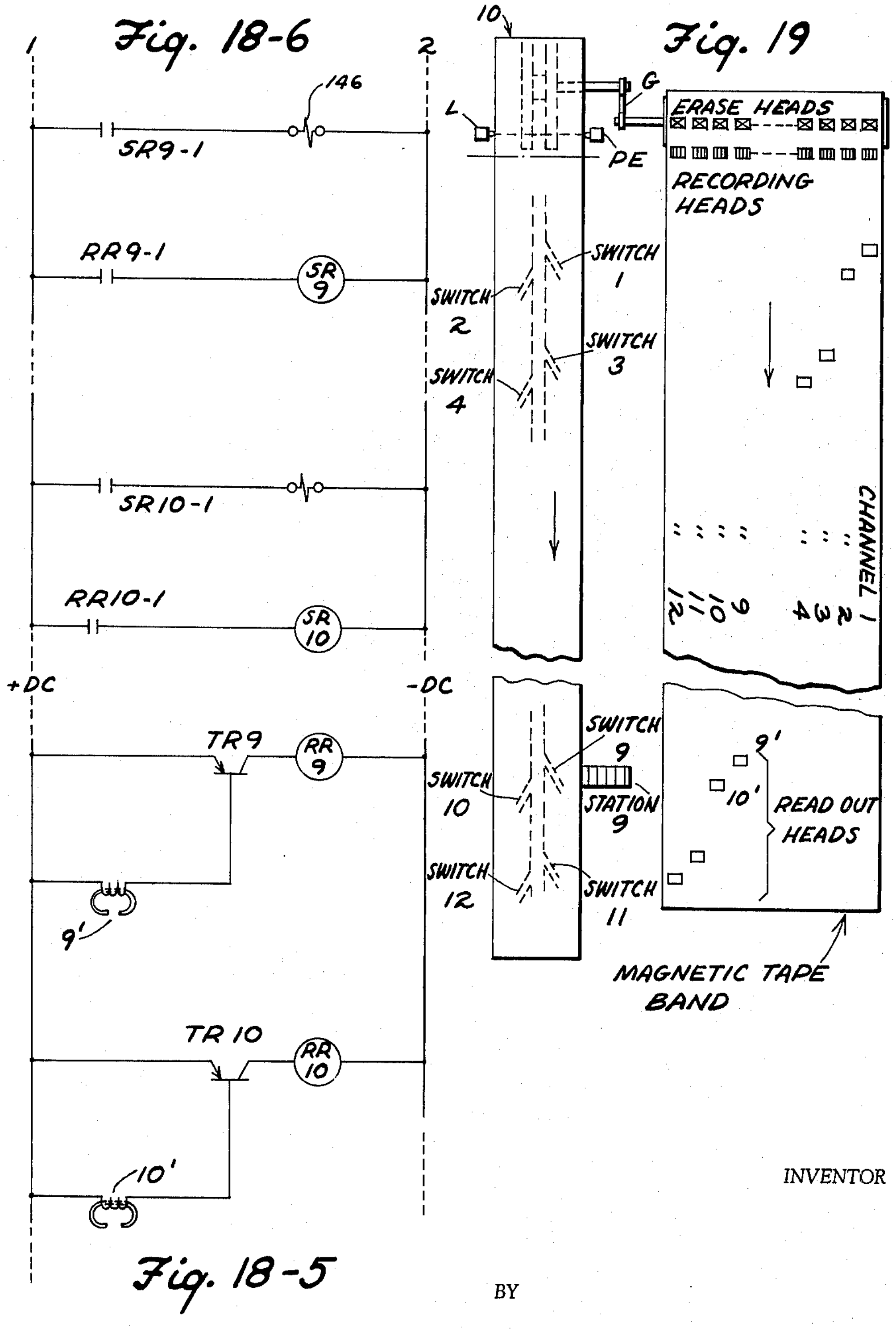

FIGS. 12*a* and 12*b* are plan and elevation views, respectively, of the switch mechanism;

FIG. 13 is a fragmentary perspective of a tilt return track arrangement just upstream of the drive sprocket wheels;

FIG. 14 is an end view of the conveyor structure, stripped of non-essential detail, showing a sprocket wheel made of spaced sections which propels the slat belt and a semi-circular guide channel track which guides the slat support elements between the sections from upper to lower flight;

FIG. 15 is a side view of FIG. 14;

FIG. 16 is a fragmentary plan layout showing the arrangement of spacer belts in tandem with the sorting conveyor belt;

FIG. 17 is an electrical schematic diagram for control of the spacer belts;

FIGS. 18–1 through 18–6 are electrical schematic diagrams for control of the slats of the conveyor, in order to effect diverting of packages at various stations, in accordance with a program on magnetic tape;

FIG. 19 is a diagram plan layout showing the relationship between the magnetic tape on which diverting signals are impressed, in conjunction with the sorting conveyor and diverter stations.

Referring now to FIG. 1, a fragmentary section of a slat conveyor of the type hereinbefore described is disclosed as a series of slats which will be understood to form a continuous belt (see FIGS. 2 and 3) and which are moving in the direction of the arrow. Such slats are all identical, and are identified with the general reference numeral 10. An operator stands at an operator station 15 at one side of the conveyor and it will be understood that he programs packages in accordance with destination with a keyboard 17. More specifically, the control system merely effects movement of a solenoid operated mechanical track switch (to be described) at each diverter station, such as diverter station 20 as indicated by the roller type secondary conveyor shown thereat. Accordingly, all slats passing such conveyor will commence to tilt upon reaching the secondary conveyor, and each slat in turn will tilt progressively until it reaches full tilt position. Considering the slats designated as 10*a*–10*e*, it will be noted that the slat 10*e* is beginning to tilt and that the slats downstream thereof are in conditions of progressively greater tilt. Thus, it will be appreciated that initially 10*a* experienced the slight degree of tilt shown by the slat 10*e* when it was in the position shown for 10*e* and then experienced gradually greater tilt up to the maximum slant depicted.

The side extension 23 of the secondary conveyor provides a safeguard for exceedingly long packages. Accordingly, any package placed on the group of slats 10*a*–10*e* will thus be gradually slid off onto the secondary conveyor. Such package may experience a certain amount of rotation due to the warping action of the progressively tilting slats, but this is of no consequence. Downstream of the slat group 10*a*–10*e* will be noted a horizontal group of four slats 10*f*–10*i* and this illustrates that such slats have not been tilted, either because they bore no parcel or they are bearing a parcel (not shown) to be diverted further on along the length of the belt. On the other hand, downstream of the horizontal group of four slats, 10*f*–10*i*, is another group of four slats, 10*j*–10*m*, and it will be noted that these are all fully tilted slats. This means that they must have borne a parcel which was either diverted at the station 20, or upstream of the station 20. Accordingly, the slats 10*f*–10*i* must be carrying a parcel or else they, too, would be in the fully tilted position of the slats 10*j*–10*m* since, as noted above, once any slat starts to tilt, all succeeding slats likewise tilt until a slat is reached which is the first slat of a parcel carrying group, regardless of how far down the belt, that is, upstream, such parcel may be.

Referring to FIGS. 2–13, it will be noted that each slat 10 is carried on a support post 30 (FIG. 7) pivoted on a pin 33 extending between the raised transverse bridges 34 of a rectangularly shaped link 36 (FIG. 9), which effects a carriage having four side rollers 40 on suitable shafts 43. The rollers carry the link on roller tracks or channels 46*a* and *b* made of angle iron (FIG. 10), for the upper and lower flights, respectively. The links are also provided with side guide rollers 49, rotative on vertical axes. Each post 30 terminates in a roller 55 that rides in a center channel 58*a* and *b*, for upper and lower flights, respectively, Thus, as viewed on FIGS. 3 and 10, the slats of the upper flight have rollers 55 that move in channels 58*a*, while the slats of the lower flight have their rollers in a corresponding channel 58*b*.

The tracks 46*a* (FIG. 10) for the upper flight are suitably supported on a channel or angle iron framing 64 of any suitable construction which may be readily constructed for the entire length of the belt, as will be clearly understood by persons skilled in the art. For example, floor pieces 67 and vertical risers 70 with corner brace plates 72 may be provided along with horizontal cross braces 75, in order to effect a strong steel skeleton for supporting the upper flight on an A-frame of sloping channels 78, any number of which may be provided. The lower flight tracks 46*b* may be suspended on vertical angle iron members 83 secured to cross braces 75.

The slats are thus carried continuously on their respective carriages or links 36 which are articulated (FIGS. 4 and 5) by means of the axles 43 for following in a vertical plane around sprocket wheels 100, 103 (FIGS. 8, 9, 13–15), each wheel comprising two spaced sections, e.g. 100*a* and 100*b* (FIGS. 14 and 15), wheel 100 being for drive and wheel 103 being an idler.

Intermediate the sprocket wheel sections is a rounded channel 108 which merges at its respective ends with channels 58*a* and 58*b* (FIG. 15). The ends of the straight and curved channels may be butt welded or fastened in any suitable manner. The sprocket wheel sections have registering and aligned notches, such as 112, spaced to register with rollers 40 and 49, so that the rollers 40 can socket therein as the rollers 55 round the curved channel 108 in the direction of the arrow. It will be noted that the spacing between rollers 49 and rollers 40 is designed so that the rollers 49 can also socket in notches 112. Thus, the articulated links effect a sprocket chain and are driven by the drive sprocket 100, and moved around the configuration from upper to lower flight, in the direction of the arrow, while the rollers 55 are guided in the central channels or in tilting channels to be later described.

Details of the sprocket drive are not essential to the invention, there being shown generally a motor 118 and a gear reduction 122, and it will be understood that the arrangement thus afforded is suitable for driving the belt continuously at a predetermined speed.

Figure 8:
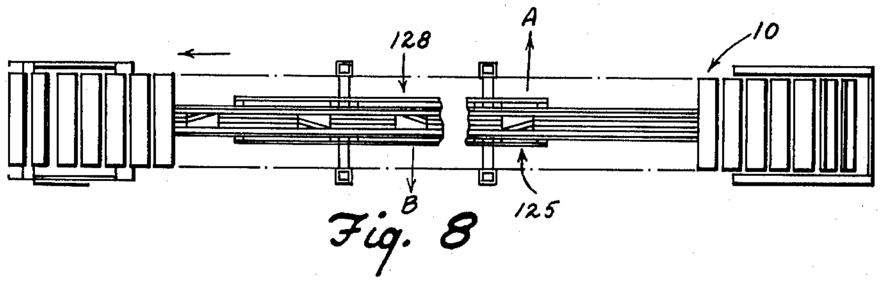
FIG. 8 is a simplified plan view illustrating a complete slat conveyor showing exemplary track switch positions.
Figure 9:
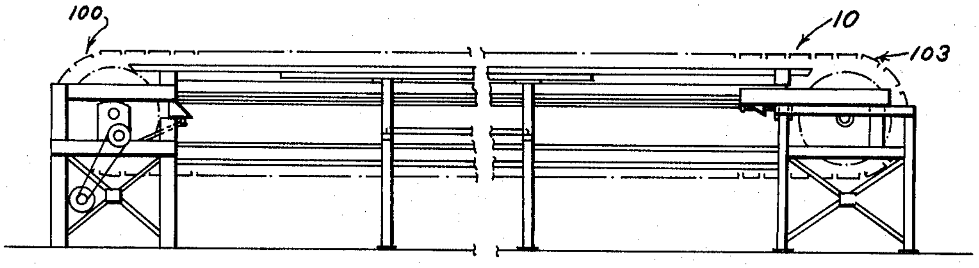
FIG. 9 is an elevation of the view of FIG. 8.

Referring now to FIGS. 8 and 9, the overall configuration of the conveyor is shown, including mechanical track switches, such as 125 and 128, which will be understood to be located at respective diverting stations to effect slat tilting. It will be noted that the track switch arrangement has bi-directional diverting effect, in the sense that switch 125 can divert packages off the belt in the direction of the arrow A, and switch 128 can divert packages in the direction of the arrow B.

Figure 10:
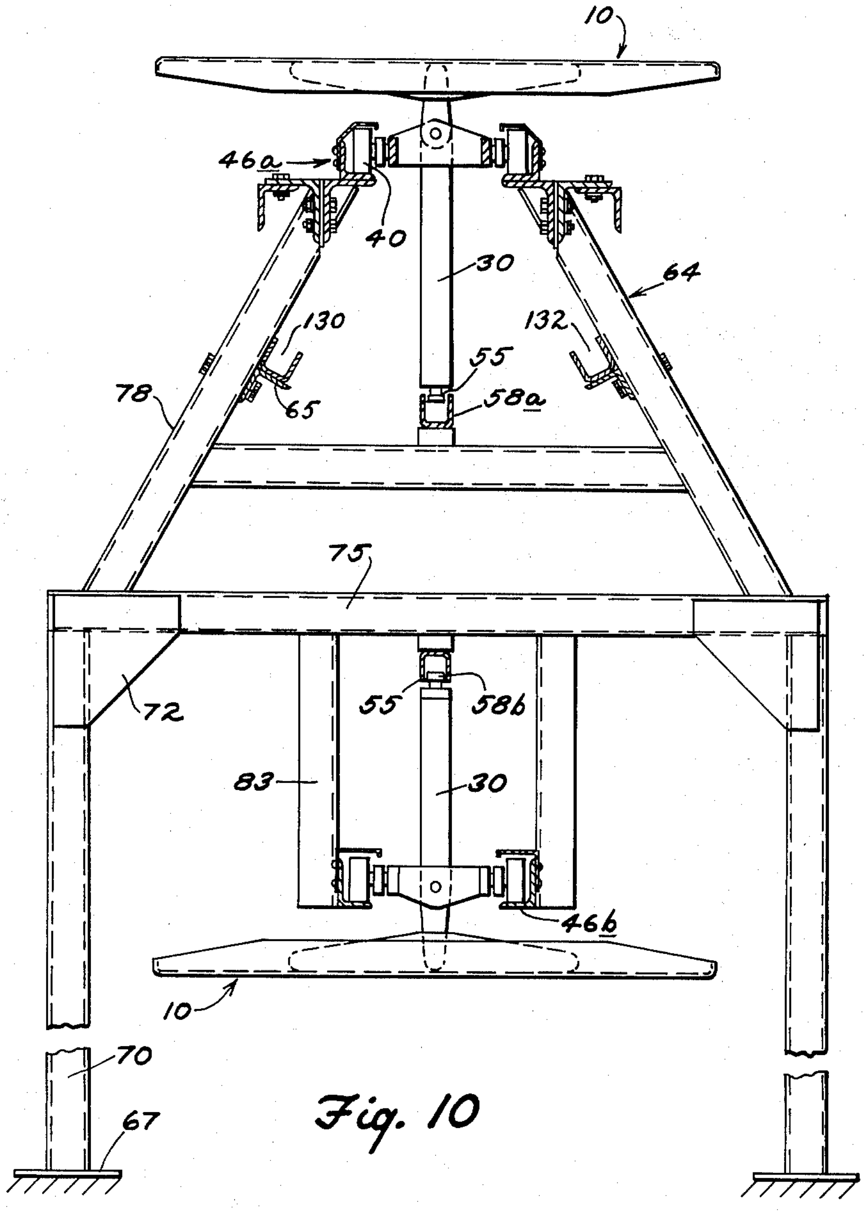
FIG. 10 is an elevation partially in section, taken transversely through the conveyor and showing the relationship of the main components for the upper and lower slat flights.

Reference is made to FIG. 10, showing tilt track channels 130 and 132 above center track 58*a* and on respective sides, supported by angle iron members on frame 65. The effect of the track switches is to shift the rollers 55 into a selective track 130 or 132, and in view of the slanted orientation and higher position of the tilt tracks, the post 30 of each slat thus operated upon by a track switch to be shunted into a tilt track is tilted accordingly, whereby the respective slats are tilted. The perspective views of FIGS. 11, 12 and 13 will make this clear.

Figures 11, 12:
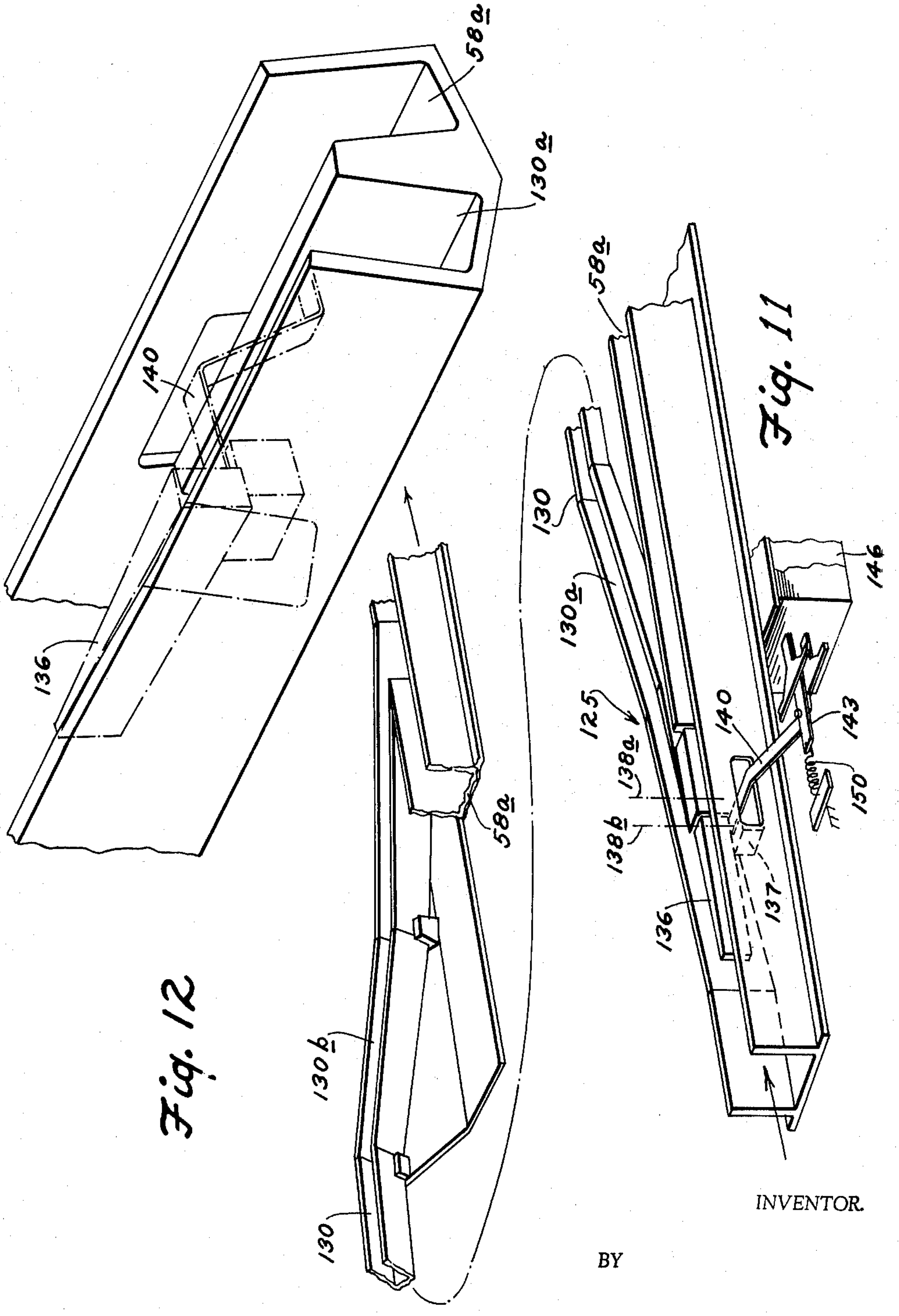
FIG. 11 is a fragmentary perspective to an amplified scale of a track switching mechanism to effect slat tilt, the sloping track to carry the roller into the tilt track, and the oppositely sloping track to return the roller to the central track prior to going over the drive sprocket.
FIG. 12 is another fragmentary perspective showing the switch mechanism on the opposite side of that shown in FIG. 11, viewed from a different angle, and illustrating a portion of a casting which effects a track junction.

Referring to FIG. 11, there is shown the disposition of a track switch, such as 125, with respect to center track 58*a*; and side or tilt track 130 which effects slat tilting when rollers 55 are switched therein. It will be noted that the rail 130 has an upwardly slanting section 130*a* and a downwardly slanting section 130*b* and it will be further understood that rollers 55, approaching in the direction of the arrow, if shunted to track 130 from track 58*a*, will ride upwardly, thus tilting the respective slats and maintaining them tilted while traversing the entire length of rail 130, as indicated by the phantom lines between the broken sections of FIG. 11, until such rollers reach the downwardly slanting return track 130*b* which merges with level track 58*a* just before the driving sprocket wheel 100, as shown in FIG. 13.

Referring to FIGS. 11 and 12, 12*a* and 12*b*, it will be seen that each switch consists of a pivotally mounted diverting tongue 136 and that, as rollers 55 in FIG. 12*a* move in the direction of the arrows in the center track 58*a*, they would ordinarily be maintained in that track, providing the switch tongue 136 is in the position shown. If, however, the tongue is rotated in the direction of the arrow, then such rollers would be shunted into the tilt track 130, going up the incline 130*a*.

It will be noted that the orientation of FIGS. 12*a* and 12*b* is for the opposite edge of the conveyor as compared with FIG. 11.

Each switch comprises an actuating means for the respective tongue. Thus, each tongue is carried on a fixed block 137 and pivoted thereto on axis 138*a* by means of a suitable pin (not shown), and the tongue is also pivoted (by a pin not shown) to a bent bar 140 which passes through a slot in the channel wall and is pivoted to solenoid plunger 143, of solenoid 146, which acting against spring 150 can rock the tongue.

Thus, energization of the solenoid effects slat tilting by shifting rollers 55 into the tilt track, and de-energization permits the spring 150 to pull tongue 136 in the position shown in FIG. 12*a* for non-tilting.

From the above description, it will be apparent that the various track switches may be controlled by the respective solenoids to effect slat tilting at respective diverting stations in a manner such that maximum tilt of the slats will be substantially in the region of the secondary conveyor (FIG. 1). It will, of course, be apreciated that the switch and tilt track arrangement is such as to divert packages off one side of the belt or the other, as explained in conjunction with FIG. 8.

The transition or entrance channel portion 130*a* (FIG. 12) will be noted as warping away from a vertical plane so as to gradually effect slat tilting.

Referring in particular to FIG. 13, the arrangement is illustrated wherein the tilted slats are automatically pivoted back to horizontal position before entering the drive sprocket wheel 100. Thus, return merging of the tilt track 130 with the center track 58*a* is accomplished by downwardly slanting exit section 130*b* which gradually guides the rollers 55 back into track 58*a*. Thereafter, the track 58*a* connects with the curved track 108 (FIG. 15) to effect continuous movement of the slats in non-tilted condition around the sprocket wheel.

It will be understood that there is an inclined rising entrance portion such as 130*a* disposed at each diverting station on one or both conveyor sides and that each such portion 130*a* merges with the tilt track for the respective side of the conveyor. However, the exit section of each tilt track is a single downwardly slanting track such as 130*b* leading to centralized track 58*a* just before the sprocket wheel 100. Thus, all slats, once tilted at any diverting station in either direction, must remain tilted until arriving at the respective exit section for that side of the conveyor.

Based on the foregoing explanation of the conveyor mechanism, it will be understood that when any solenoid 146 is energized at a respective diverter station, the switch mechanism controlled thereby will effect deflection of the switch tongue 136 so that all rollers 55 of the moving conveyor will be deflected into the entrance sections of the tilt tracks and by virtue of the twisting or warping of such entrance sections from relatively vertical to approximately a 60 degree angle of the channel walls, all posts 30 will be pivoted accordingly. All successive slats will thus be tilted, as explained in conjunction with FIG. 1 and, except for control by a memory system to be hereinafter described, all slats will continue in their tilted condition until just before reaching sprocket wheel 100, where, as will be clear from FIG. 13, the rollers 55 then descend downwardly through the warped exit section 130b. The slats are then once more horizontal as the rollers 55 pass into the central track 58a and then progress between the sprocket wheel sections guided by the arcuate channel track 108, as shown in FIG. 15.

Control of the conveyor is effected by a memory or programming system to enable an operator or operators to divert parcels selectively at the stations.

The electrical circuitry of the control system is effective to prevent tilting of any slats carrying a parcel where such parcel is intended to be diverted downstream of a station at which the track switch is actuated. This is brought about by de-energization of the latter switch solenoid responsive to sensing of entry of that parcel on the conveyor, a photoelectric cell being used as a sensing means. Full circuit explanation will hereinafter be given.

It will, of course, be appreciated that the slats could be spaced apart several inches and need not be closely adjacent each other. This would, of course, depend on the nature and size of articles to be handled. If necessary, a flexible rubber or plastic belt may be disposed encompassing all the slats so as to provide support intermediate the slats for articles placed on the conveyor. Of course, such a belt would have to be of sufficient flexibility so as to readily yield as the slats tilt. Further, as an economy measure in construction, it would be possible to have alternate slats merely carried between adjacent slats as by tension springs or chains, or by any other medium which will effect proper support and allow relative flexure.

With such an arrangement the supporting posts for alternate slats together with the roller carriages therefor could be eliminated. Thus, the roller carriages would be spaced by suitable links sufficient to provide flexibility of the articulated carriages in going around the sprocket wheels.

Various other modifications of the mechanical arrangement could be made, as will be evident to persons skilled in the art and the above discussion is merely to point out the breadth of the invention.

*The spacer system*

In order to effect proper operation of the slat belt sorter hereinabove described, it is essential that all slats under a particular parcel effect tilt at a designated diverting station. To achieve this, proper spacing of parcels in the direction of flow is necessary. The system hereinbelow described, prevents two parcels from resting on the same slat and in fact ensures a separation between trailing and leading ends of consecutive parcels so as to maintain a spacing of more than one slat width in the flow direction between such parcels.

Thus, in actual practice with an operating machine, a minimum spacing of 12″ is desired, whereas the slat width is approximately 8″ with one inch space between slats.

The spacing system for assuring proper separation between parcels, is shown in conjunction with FIGS. 16 and 17 wherein FIG. 16 shows the tandem disposition of the conveyor belt 10 and a series of spacer conveyor belts designated as belt 1, belt 2 and belt 3.

Packages are initially loaded on belt 1. Assuming that the desired speed of conveyor 10 is 180 feet per minute, an appropriate speed for belt 1 could be 135 feet per minute, and this belt could be kept continuously running under usual loading conditions. The normal speed of belt 2 would then be 155 feet per minute and that of belt 3 would be 180 feet per minute, and these latter belts are driven by a common motor M through a pulley system as shown. The motor is of a type which can start and stop very rapidly, being equipped with suitable automatic braking for quick stop. The motor may be operated from a three-phase line through the solenoid operated motor starter, MS, having contacts in four lines $L_1$, $L_2$, $L_3$ as shown.

At the downstream end of belt 3, there is arranged a light which sends a beam across the belt to a photocell PC and it will be understood that any package crossing between the light and the cell, will interrupt the beam.

Assuming that packages 3 feet long are placed on belt 1, end to end, that is on 3 feet centers, their center to center spacing would be $$3 \text{ ft.} \times \frac{180}{135}$$

or 4 feet, in going from belt 1 to the conveying belt. Accordingly, the space between consecutive packages would be one foot.

It can be assumed that parcels are frictionally gripped at their centers of gravity in moving to a successive belt and that such centers of gravity are at parcel centers. This would not usually be the case, but the system is operative as described regardless of random center of gravity spacing.

Where the end to end spacing is one foot there would be no need for belts 2 and 3. However, assuming that packages are only 1½ feet long, their center to center spacing, when placed on belt 1, would then be only 1½ feet and at the time of arrival at the sorting conveyor belt, such spacing would only be 2 feet. The spacing between packages would then be only 6″ and additional spacing is required to ensure accuracy in diverting. By means of the belts 2 and 3 which stop and start responsive to conditions of spacing, parcels are spaced further apart when sensed at less than one foot spacing.

A general description and operating of the spacing control system is as follows: Condenser C (FIG. 17) has a time rate of discharge via variable resistance R3 that corresponds to the desired spacing as a matter of travel time of articles on Belt 3. Thus, R3 is variable to predetermine such spacing, and condenser C discharges through R3 as long as the photocell is illuminated. On the other hand, C is charged while an article is passing the photo-cell, charging being accomplished quickly through resistance R2, which resistance is for preventing excess current rather than limiting the rate of charge, since it is desired to charge C as rapidly as possible but to discharge it through the time constant circuit which comprises R3–C while the cell is illuminated.

The extent of discharge of C (FIG. 17) determines whether or not belts 2 and 3 are operative. If the parcels are too close, insufficient discharge occurs due to the cell being darkened too soon by the upstream parcel. The motor stops substantially as soon as the beam is blocked by the upstream parcel and it remains stopped long enough for the downstream parcel to be carried off on conveyor 10 so as to effect a one foot spacing before the upstream parcel is again moved.

A pair of transistors (PNP type) are provided, one of which, TR1, is responsive to the article sensing means, i.e., the photocell PC to condition certain relays for control of charge and discharge of C, and a transistor TR2 which controls the actual starting and stopping of motor M via relay means responsive to charged or discharged condition of C.

Accordingly, whether or not the motor starts or stops is a matter of the time occurring between illumination and darkening of PC which depends on the spacing between the trailing edge of a parcel and the leading edge of a successive parcel, as compared with the time constant of R3–C, which is designed so that C will discharge if the spacing is a foot or more.

The detailed description and operation of the motor control circuit of FIG. 17 now follows.

Assume no articles on the belts 1 and 2, and the motor M is running energized from the A.C. lines, current passing through MS via relay contacts of circuitry to be hereinafter described. The photocell PC is illuminated, the transistor TR1 being biased thereby to conduct.

Photocell PC is a photo resistive type and is in series with a resistor R1 having a value about midway between the light and dark resistance of the cell. Thus, conducting bias for TR1 (base negative and emitter positive) is effected by the D.C. common line to the emitter and through photocell PC from the −24 v. line $V_1$ to the base, wherein the common line has a potential midway between −24 v. and +24 v., the total voltage being 48 v. between negative and positive lines $V_1$ and $V_2$, respectively. Condenser C, which was charged from the line $V_2$ (positive) via R2 when the system was turned on has discharged via R3–C to line $V_1$ (negative) for the reason that current through TR1 has activated a relay CRA in the collector circuit to line $V_1$. Thus, contact CRA–1 activates a relay CRB to close contact CRB–3 in series with condenser C effecting a discharge path to line $V_1$. As long as the photocell remains illuminated, the condenser C remains discharged, assuming no parcel blocks the beam, and current for MS thus passes through contact CRA–2, and also through a contact CRC–2 of a relay CRC, responsive to a conducting condition of transistor TR2, but no MS current passes through NC contact CRB–4 which is open at this time (CRB energized).

Transistor TR2 is connected across the D.C. lines $V_1$ and $V_2$ with the relay CRC in series with the transistor output. When TR2 conducts, relay CRC is energized and contact CRC–2 maintains energization of the motor starter solenoid MS to keep the motor running, even should relay CRA become deenergized whence CRA–2 would be opened.

As long as no article interrupts the beam, the above condition obtains, i.e., relays CRA, CRB, CRC are activated, transistors TR1, TR2, continuously conduct, no charging current from line $V_2$ line goes to the condenser C and the condenser is discharged.

Transistor TR2 remains conducting (base negative and emitter positive) due to the state of discharge of condenser C; the NC contact CRB–2 in series with R2 being open, no charge can go to condenser C from line $V_2$, and CRB–2 being closed current from line $V_1$ can pass to the base.

However, TR–2 becomes biased to cut off (base becomes poistive) should condenser C become charged positively from line $V_2$ and this charge occurs very rapidly should the cell be darkened by parcel interruption of the light beam. Such interruption also causes transistor TR1 to be biased to cut-off due to the large voltage drop across the photocell when it is darkened which removes negative bias from the base and leaves a positive bias via R1.

Thus, assume the leading edge of a package cuts off light to the photocell PC. The collector current for TR1 is cut off, deactivating relay CRA to open contact CRA–1 which de-energizes relay CRB. Since CRC is still energized, current is broken through contact CRB–1 which would otherwise serve as a sealing-in contact for relay CRB if NC contact CRC–1 were closed. However, the motor starter MS is still activated via contact CRC–2, although CRA–2 is now open. Further, contact CRB–3 opens while contact CRB–2 and CRB–4 close at this time. This effects charging of the condenser to 24 v., thereby biasing transistor TR2 to cut off, which then deactivates relay CRC. This, of course, occurs very rapidly, as explained above, the resistance R2 being merely to prevent excess current flow to the condenser, which might be harmful, and does not constitute any part of a time constant circuit except to the extent of protecting the condenser. Since contacts CRC–2 and CRA–2 are now both open, maintenance of activation of the motor starter MS is effected only by way of NC contact CRB–4, closed due to present deactivation of relay CRB. Accordingly, at this time the motor starter MS remains activated and the Belts 2 and 3 continue to run as long as the parcel or article is passing the photocell.

The above sequence of events conditions the system to effect stopping of the motor should the leading edge of the next successive article be less than a foot upstream of the preceding article, while at the same time maintaining the system in condition to permit continued motor operation should the next successive article be a foot or more upstream.

This conditioning of the system permits control by the setting of the variable resistor R3 such that the discharge time of the condenser C to the point where the transistor TR2 becomes conducting again, responsive to illumination of the photocell after the package passes, is set to correspond to one foot of movement of the parcels on Belt 3.

Thus, assuming the leading edge of a second package is spaced a foot or more from the trailing edge of the downstream package. When the first package passes completely, the photocell is illuminated, CRA is energized via TR1 as once more conducts. CRB is energized; contact CRB–2 opens, charging current is cut off, while CRB–3 closes to permit the condenser discharge. The condenser C has time to discharge through R3 in the time that the photocell is illuminated, the light beam passing, of course, through the foot or more spacing between the two packages.

Forward bias is thus restored to transistor TR2, effecting energization of relay CRC via collector current, and all previous conditions are thus restored wherein CRA–2 and CRC–2 are closed, while CRB–4 is open. The motor starter remains energized via CRA–2 and CRC–2.

Assume, however, that the spacing between two successive packages is less than one foot in passing the beam. Beam cut off by the leading edge of the second package renders transistor TR1 non-conductive prior to the time condenser C can discharge to the point where TR2 becomes conducting. Accordingly, relay CRC remains de-energized and relay CRA now becomes de-energized. However, relay CRB remains energized since CRB–1 seals it in in series with the normally closed contact CRC–1. Thus, contact CRB–4 is open. Since CRA–2 was opened due to cut off of transistor TR1 and CRC–2 is open due to continued cut off of transistor TR2, the opening of all such contacts cuts out the motor starter to stop the motor.

Thus, the Belts 2 and 3 cease motion and the package on Belt 3 blocks the beam at the downstream end of the belt, remaining there until condenser C fully discharges to the point where TR2 becomes again conductive. By this time the preceding package has been carried off by the conveyor 10, and thus there is at least one foot of space provided between the stationary package and the preceding package. Upon TR2 becoming once more conductive after condenser discharge, relay CRC is again activated, CRC–2 closes and the motor starter is again activated whence the belts renew their motion. At this time CRC–1 opens to deactivate CRB and thus closes the normally closed contact CRB–4. Likewise, CRB–3 opens and CRB–2 closes to again charge the condenser to bias the transistor TR2 to cut off, whence relay CRC is again deactivated, conditioning the system for the next package interruption of the light beam.

In substance, therefore, the contact CRC–2 maintains the belts running as long as transistor TR2 is conductive, the contact CRA–2 maintains the belts running as long as the photocell is illuminated and the contact CRB–4 maintains the belts running so long as there is at least one foot spacing between successive packages.

In order to insure proper operation of the system the condenser can charge through the resistor R2 in approximately 1/100 of the time that it can discharge through resistor R3. This permits operation of the system in response to packages as small as some two inches in length.

*The memory system*

Reference is made to FIGS. 18–1 through 18–6 showing the circuitry for programming the conveyor to divert parcels off the belt at selected designations, and to FIG. 19 showing the diagrammatic relationship between a magnetic tape record and the slat conveyor 10.

Referring particularly to FIG. 19, it will be noted that the magnetic tape and the slat conveyor have a common drive such as any suitable motor-driven means G, e.g., gearing or the like, powered by a motor (not shown).

The magnetic tape has extending transversely thereacross a series of erase heads upstream of respective recording heads. It will be understood that there are twelve heads of each set disposed over twelve respective recording channels on the tape and that there are twelve respective readout heads, e.g., 9'; 10'; downstream to correspond in longitudinal position to the locations of the various track switches along the conveyor.

The recording heads are disposed one slat width downstream of the photocell PE which senses parcels as they enter the conveyor upstream of the diverting stations. The track switches are generally indicated as Switch 1, Switch 2, Switch 3, Switch 4 . . . Switch 9, Switch 10, Switch 11, Switch 12, corresponding to Channel 1, etc., on the tape, as will be clearly understood from the drawing. Thus, readout head 9' over Channel 9 controls track Switch 9, and is spaced from readout head 10' which controls track Switch 10 in the same ratio as the spacing between track Switches 9 and 10.

Accordingly, as the tape and the conveyor move, the erase heads first clear the tape of previous signals whence the recording heads can record signals in their respective channels for each track switch to be operated. Thus, a signal, e.g., in Channel 10 will be picked up by readout 10' at a time that a parcel is approaching track Switch 10 and the switch will be operated by its solenoid to commence tilting the slats on which the parcel rests in a manner heretofore described.

The programming of the tape is illustrated in the present instance in a simplified system utilizing a single operator rather than several operators, but it will be understood that a multi-operator system could be used, it then being necessary, of course, to provide suitable circuitry of the kind to be described for each operator with interlinking circuitry to ensure proper sequence of programming. For example, if two or more operators wish to divert respective parcels at Switch 9, it is, of course, necessary to have delay circuitry for holding the separate signals for sequential recording. Referring to FIGS. 1, 16, 18–1, 18–2, an operator would be positioned at a loading point for conveyor 10 and he has a series of push buttons PB–1 through PB–12, only the first four being illustrated in FIGS. 18–1, 18–2, since all others are a duplication of the system arrangement. Thus, as a parcel is loaded, say on Belt 1 of the spacer system (FIG. 16), the operator notes the designation insofar as it pertains to a diverter station on conveyor 10 and presses the corresponding push button to record a signal on the magnetic tape which signal at the time of readout has moved under a readout head corresponding to the selected diverter station, effecting tilting of the slats at that station, this being the time of arrival of the parcel at that station.

Referring now to FIGS. 18–1 and 18–2, each of the push buttons connects to a corresponding so called "MR" relay which is a signal storing relay, such as MR1, MR2, . . . MR12, etc., activated at the time the respective button is pushed. Such activation effects storage of the signal until subsequently acting signal recording control "KR" relays, or coding relays, such as KR1, KR2, . . . KR12, etc., corresponding to respective relays MR1, MR2, etc., have been reset to remove any previous activation which they may have had. The MR relays then transfer the respective stored signals to the corresponding KR relays, causing respective activation thereof to apply a 1000 c.p.s. signal to a respective tape channel. Such signal is placed on the tape so that it will reach the appropriate readout head just before the slat under the leading edge of the programmed parcel reaches the appropriate track switch controlled by that readout head. The KR relays are sealed in energized condition until the next parcel has been loaded on Belt 1 and is programmed. However, if no further parcel is thus programmed the track switch at that station will remain in actuated condition and, thus, tilts all slats passing the station, indefinitely. If another parcel is programmed, the KR relays are reset, such tilting effect ceasing.

The above describes the general operation of the memory system, a detailed description of which will now follow.

A light L and photocell PE (FIG. 19) are arranged adjacent the upstream end of conveyor 10 and it will be understood that the coding push buttons PB1, etc. (FIGS. 18–1, 18–2) are pressed before a parcel interrupts the beam from the light to the cell. Actuation of a push button activates the corresponding MR relay which seals in through a normally open contact, for example MR1–1, MR2–1, etc. to store the signal. The energizing current is from the A.C. lines 1 and 2 shown, the common push button line 3 being shown connected to line 1 in FIG. 18–2. Activation of any such MR relay in the manner described closes a second contact such as MR–1–2 (FIG. 18–2) which energizes relay CRG to open its normally closed contact CRG–1 extinguishing a Selection lamp which indicates that a code signal has been entered in the system. At the same time normally closed contact CRG–2 (FIG. 18–2) is opened which disconnects the push button common line 3 from A.C. line 1 so that all push buttons then become momentarily inoperative against entry of a subsequent signal.

Any MR relay thus activated remains activated until the parcel for which it has been coded breaks the photocell beam. At this time the photocell ceases to conduct.

The photocell is of a photoresistive type having relatively high conduction when illuminated. It is in series with the resistor R4 across positive and negative D.C. lines as shown (FIG. 18–3). Resistor R4 is about half the dark resistance of the cell and D.C. current is afforded thereto by the full wave rectifier $R_0$ powered by the transformer T connected to the A.C. lines 1 and 2. The photocell controls operation of a transistor TR1 which is nonconductive when the cell is illuminated, due to lack of emitter current since the emitter and base are substantially at the same potential by virtue of the high conductivity of the illuminated photocell, as will be understood from FIG. 18–3, wherein the diode D has no effect on bias current for the transistor, but permits discharge of a condenser C2.

Thus, when current ceases to flow through the photocell, as when a parcel is passing it, the dark resistance is high and the base of TR1 is rendered negative via resistor R4 and condenser C2 and the transistor then passes current to relay EE to energize that relay. Such energization is momentary and lasts only until the capacitor C2 is sufficiently charged so that base current ceases and the transistor again becomes non-conductive. The value of C2 is such that relay EE is energized for some 30 to 50 milliseconds. Upon restoration of the light beam, the package completely passing it, the capacitor rapidly discharges through the photocell and also through a diode D so that the circuit is prepared to repeat the momentary energization of relay EE for the next package.

When EE is energized the closure of contact EE1 energizes a relay CR1 which in turn energizes a relay DRA (FIG. 18–4) through contact CR1–1. Relay DRA seals in through its contact DRA–1 and also through normally closed contact CR3–1 of a relay CR3.

The energization of relay DRA conditions the circuit for the next closure of a cam-operated contact P which sets up a train of events that de-energizes all KR relays as explained below. Contact P closes momentarily each time the leading edge of a slat aligns transversely with the photocell and it will be understood that a suitable synchronizing drive (not shown) is present to rotate the cam $P_c$ in order to achieve the desired function.

Since DRA is energized, closure of contact P energizes relay CRZ via contact DRA–2 (FIG. 18–3) by virtue of the series connection across the D.C. lines.

Figure 4:
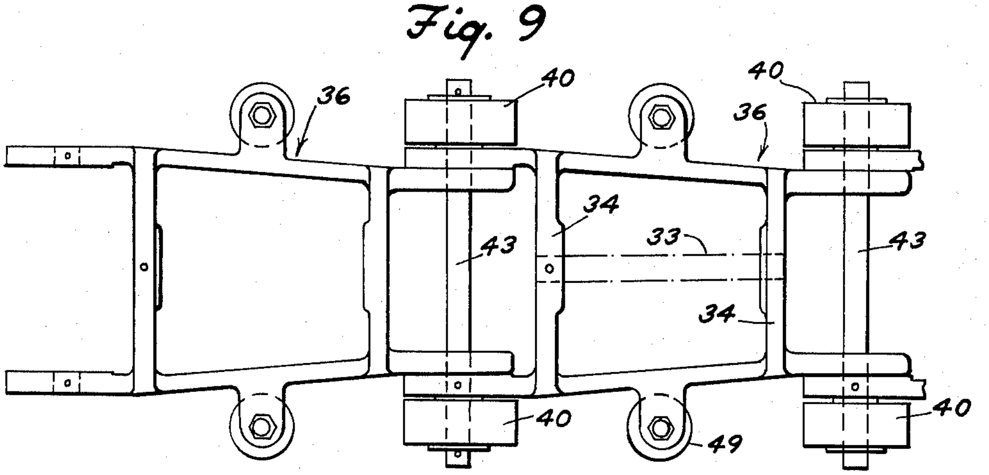
FIG. 4 is a plan view showing articulated links which support the slats.
Figure 5:
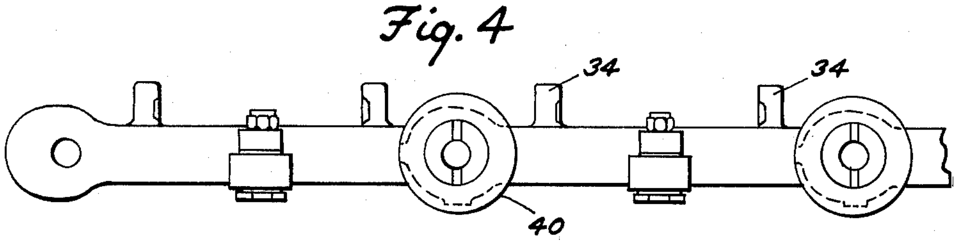
FIG. 5 is an elevation of FIG. 4.

Energization of relay CRZ opens the normally closed contact CRZ–1 (FIG. 18–3) and thus deenergizes all KR relays by disconnection from A.C. line 1. At the same time, contact CRZ–2 closes the CRZ–3 opens which charges the capacitor C3 (FIG. 18–4). All this occurs as switch P closes; however, as soon as P opens in the course of rotation of cam $P_c$, CRZ is deenergized so that CRZ–2 opens and CRZ–3 closes, to permit C3 (FIG. 18–4) to discharge through the relay CR2 whence energization of that relay occurs for a short duration, 30 to 50 milliseconds as determined by the value of C3, and results in the application of power to the contacts MR1–3 through MR12–3 of the MR relays via contact CR2–1 (FIG. 18–2) from A.C. line 1. These MR contacts are connected to respective KR relays, whereby any KR relay corresponding to an MR relay energized by a selected push button, is energized.

Accordingly, the respective KR contact (FIG. 18–4) such as KR1–2, KR2–2, etc., is closed to send a 1000 c.p.s. from a conventional oscillator (FIG. 18–4) as a continuous signal to the respective tape channel recording head whence the signal is recorded in a respective channel. The length of the signal is determined by the length of time the particular KR relay is energized which in turn depends on light beam interruption by the next package.

As the tape moves, the signals are picked up by the respective readout heads (FIG. 18–5) e.g., readout heads 9' and 10', which acting through respective amplifying transistors, such as TR9, TR10, etc., energize respective relays, RR9, RR10, etc., to close respective contacts RR9–1, RR10–1, etc., thus energizing the solenoids SR9, SR10, etc., having respective contacts SR9–1, SR10–1, etc., which cause actuation of respective track switch solenoids at the diverting stations to operate respective track switches.

Further, momentary energization of relay CR2 as described above also closes contact CR2–2 (FIG. 18–4) which permits charge of capacitor C4 from the D.C. lines; as soon as CR2 is de-energized upon completion of discharge of C3 therethrough, normally closed contact CR2–3 closes to momentarily actuate relay CR3 by discharge of C4 therethrough. Thus, normally closed contact CR3–1 is opened (FIG. 18–4) as well as normally closed contact CR3–2 (FIG. 18–2). This deenergizes relay DRA (relay CR1 de-energized to open CR1–1 when EE is deenergized) and all MR relays, the sealing current being broken for these relays. Deenergization of the MR relays effects deenergization of relay CRG (FIG. 18–2) due to opening of contacts MR1–2 through MR1–12. Accordingly, the NC contact CRG–1 is closed to light the Selection light, indicating the system may be coded for the next parcel, since all push buttons are now again live due to closing of NC contact CRG–2 (FIG. 18–2) when CRG was de-energized.

All KR relays remain actuated due to sealing in at NC contact CRZ–1 (FIG. 18–3) and remain actuated until the entire sequence is repeated by another parcel interrupting the light beam to cut off cell PE, thus energizing CRZ to open CRZ–1.

As shown in FIG. 18–2, a "cancel switch" is provided in series with lines 1 and 4. In the event the operator miscodes a parcel, pressing of this button switch cuts the current to all MR relays via their sealing contacts thus neutralizing the previously stored signal.

Due to the continued activation of any coded KR relay until a succeeding parcel interrupts the light beam, all slats reaching the respective track switch will be tilted and remain tilted until they arrive at the drive sprocket wheel 100 (FIG. 15) where they are mechanically brought back to horizontal position as previously explained.

All recordings are erased as the tape passes under the erase heads and the tape channels are then ready for fresh programming.

In summation of the above discussion:

A parcel is programmed by an operator pressing a push button at the time the parcel is loaded onto the conveyor or onto any entrance belt, but upstream of the photocell. The photocell controls all functioning of the circuitry described. Pressing of a selected button effects signal or code storage in a storage (MR) relay. At this point, the selection has been made and the selection lamp shown in FIG. 18–2 is extinguished so that no further selection will be made by the operator until that light is once more lit.

The system is thus conditioned for recording the signal on the tape band and this occurs when the parcel programmed interrupts the light beam.

At that time a connection is completed to cam switch P which switch is continuously closing and opening with each slat passing the beam, so that on the next closure of cam switch P after the beam is interrupted by a parcel all previously energized code relays, that is KR relays, are deenergized. Subsequently, switch P opens and the code relay for which the respective storage relay has been energized is then likewise energized. Following a short delay, due to the effect of condenser C4, such storage relay is then deenergized and the selection light is lit once more, apprising the operator that the next parcel may be coded.

Accordingly, the automatic deenergization of the coding relays depends upon the occurrence of three sequential conditions.

(1) Operator makes a station selection by pressing a coding push button.

(2) The beam is interrupted when the programmed parcel passes the sensing means, i.e., the photocell.

(3) Switch P closes.

Energization of the selected coding relay occurs as a fourth and rapidly following condition, namely, the opening of the switch P.

Any coding relay thus energized effects actuation of a respective solenoid track switch via the recording tape and readout system, and such track switch remains actuated to continually tilt all slats arriving at that station. This condition remains until the respective code relay is deenergized which can occur only by the sequence enumerated above, namely, the programming of another parcel. Thus, if no subsequent parcel is put on the conveyor, the slats will continually be tilted at an actuated track switch for as long as the conveyor runs. It will readily be seen that the length of signal on the tape band is then only a function of the spacing between successive parcels and is in no sense a function of the length of any particular parcel.

The same storage relay may be selected twice in a row, if it is desired to divert successive parcels at the same station. This is made possibly by deenergization of all storage relays each time the switch P opens. Such deenergization occurs with suitable delay (a function of condenser C4) in order to ensure energization and recording functioning of the same selected coding relay which likewise occurs upon opening of the switch P and which is to be again selected.

What is claimed is:

1. In a sorting conveyor system, an endless belt comprising means providing a plurality of slats individually tiltable to effect sliding off of parcels carried on a plurality of slats, each of said slats being supported on a post, a carriage for each slat and the respective post being pivotally carried thereby, said carriages being articulated, each carriage having support rollers, and track means on which said support rollers move, a sprocket wheel drive at one end of said belt having spaced sprocket wheels provided with peripheral notches to engage said rollers for effecting drive of said belt, one end of each of said posts being disposed in a guide track to normally maintain level position of said slats, at least one diverting station along the length of said belt, a tilt track extending alongside of said guide track and spaced vertically and horizontally with respect thereto and having an upwardly rising entrance portion disposed at said station and said entrance portion being disposed adjacent said guide track to form a switch junction, a track switch disposd at said junction actuatable to shift said posts from said guide track to said tilt track to thereby effect tilt of said slats, said tilt track having an exit portion slanting downwardly toward said guide track and merging therewith whereby said posts are shifted thereinto for effecting levelling of said slats, said guide track having a curved portion intermediate the sprocket wheels and substantially concentric therewith whereby said posts are guided around the center of rotation of said sprocket wheels when said slats are moving from an upper to a lower flight of said belt.

2. A system comprising means providing an endless belt made of a plurality of normally level slat elements articulated to each other whereby said elements are tiltable in groups to effect diverting of parcels therefrom, means for tilting said elements at a selected point along the length of said belt and for retaining said elements in tilted position to the end of said belt and wherein all successive elements would normally be thus tilted in arriving at said point, and control means responsive to the sensing of successive spaced parcels on said belt for neutralizing the previously mentioned means so as to retain level condition of a group of elements upstream of tilted elements whereby a parcel carried on said group may be diverted at a selected point downstream of said first mentioned point by tilting of said group of elements thereat.

3. A conveyor belt comprised of means providing a plurality of tiltable elements, means for supporting and means for tilting said elements to effect selective, continuous and successive tilting in either rotational direction of groups of said elements from a level position whereby respective parcels carried on a group of elements may be diverted at points along said belt and on either side thereof, said tilting means comprising a pair of tilt tracks, means whereby said elements are normally guided for level movement, and said tilting means also comprising members connected to said elements and shiftable into either of said tilt tracks to effect tilting of said elements in a selected direction.

4. An endless conveyor belt comprised of means providing a plurality of tiltable slats, tilting means for tilting said slats to effect tilting thereof in groups in either rotational direction from a level position whereby respective parcels carried by said groups may be diverted at points along said belt and on either side thereof, said tilting means comprising a pair of spaced tilt tracks, guide means extending along said belt and members connected to said slats disposed for engagement therewith for guided movement intermediate said tilt tracks whereby said slats are maintained level, and track switching means for shifting said members into either of said tilt tracks to effect tilting of said slats in a selected direction.

5. An endless conveyor belt comprised of means providing a plurality of tiltable slats, means maintaining said slats normally level, and tilting means for actuating said slats operative to effect sequential tilting of successive slats in either rotational direction from a level position whereby loads carried thereon may be diverted at points along said belt and on either side thereof, said tilting means comprising a pair of spaced tilt tracks, members connected to said slats and being disposed for movement intermediate said tilt tracks when said slats are level, and track switching means engageable with said members for shifting said members into either of said tilt tracks to effect tilting of said slats in a selected direction.

6. An endless conveyor belt as set forth in claim 5, including a guide track intermediate said tilt tracks for maintaining said slats normally level, said members being guided therein, said track switching means comprising a switch juncture between said guide track and each said tilt track, and said tilt tracks being at a different level relative to said guide track and having sloping entrance transition portions connecting with said guide track at each diverting station so as to effect gradual tilting of successive slats.

7. In a sorting conveyor system, an endless belt comprising means providing a plurality of slats individually tiltable to effect sliding off of parcels carried on a plurality of slats, each of said slats being supported on a post, a carriage for each slat and the respective post being pivotally carried thereby, said carriages being articulated, each carriage having support rollers, and track means on which said support rollers move, a sprocket wheel drive at one end of said belt having spaced sprocket wheels provided with peripheral notches to engage said rollers for effecting drive of said belt, each of said posts being disposed in a guide track to normally maintain level position of said slats, at least one diverting station along the length of said belt, a tilt track extending alongside of said guide track and spaced vertically and horizontally with respect thereto and having a slanting transition entrance portion disposed at said station and said entrance portion being disposed adjacent said guide track to form a switch junction, a track switch disposed at said junction actuatable to shift said post from said guide track to said tilt track to thereby effect tilting of said slats, said tilt track having a transition exit portion slanting toward said guide track and merging therewith whereby said posts are shifted thereinto for effecting levelling of said slats, and said guide track having a curved portion intermediate the sprocket wheels and substantially concentric therewith whereby said posts are guided around the center of rotation of said sprocket wheels when said slats are moving from an upper to a lower flight of said belt.

8. In a sorting conveyor, means providing a plurality of articulated members in the form of a continuous belt with said members being mounted for individual tilting in respective planes generally transverse to the direction of movement of said belt, means for progressively tilting said members from a co-planar initial condition commencing with a first member at a predetermined position along the path of travel of said belt whereby all members following said first member are tilted in the same direction and each member in turn is gradually tilted from the time it reaches said predetermined position to the time at which it is fully tilted and whereby said tilting is operative to cause an article carried on said members to slide off in the direction of tilt by progressive gravitational forces acting thereon, each of said members carried on a post, means for mounting said posts for pivotal movement in respective transverse planes, a guide track and said posts being disposed to be guided thereby for maintaining an initial position of said members, a tilt track spaced from said guide track and extending along a predetermined length thereof and having a gradual sloping entrance portion merging with said guide track at a switch junction for shift of said posts from said guide track to said tilt track, and a switch device disposed at said junction and being actuatable to switch said posts from said guide track to said entrance portion to thereby effect gradual tilt of said members.

9. In a sorting conveyor as set forth in claim 8, said tilt track comprising a channel having side flanges disposed at an angle to the plane of said conveyor.

10. In a sorting conveyor as set forth in claim 8, said tilt track having an exit portion slanting toward said guide track and merging therewith, whereby said posts are shifted thereinto to effect the co-planar initial condition of said members.

11. A continuous conveyor comprised of means providing a plurality of articulated carriage members pivotally joined to each other, support posts carried by said carriage members and being pivotally mounted thereon so as to pivot in planes transverse to the direction of movement of said conveyor, load support members carried by said posts and secured thereto so as to be tilted when said posts are undergoing pivotal actuation, a guide track disposed between upper and lower flights of said conveyor, said posts being engaged with said guide track to retain said load support members in level position, a tilt track extending alongside said guide track and displaced vertically therefrom, an entrance transition track section joining said guide and tilt tracks, and a switch device for effecting shifting of said posts from guidance in said guide track to guidance in said tilt track whereby tilting of said load support members is effected.

12. A continuous conveyor as set forth in claim 11, said guide track comprising a continuous structure having upper and lower flights joined by arcuate portions adjacent the ends of said conveyor, and said tilt track extending alongside said upper flight.

13. A continuous conveyor as set forth in claim 12, a rotary support element at each end of said conveyor, and the arcuate portions of said guide track being substantially concentric therewith.

14. A continuous conveyor as set forth in claim 13, an additional transition track section joining said guide and tilt tracks and disposed adjacent an end of said conveyor and operative to guide said support posts from said tilt track to said guide track.

15. A moveable conveyor belt comprising means providing a series of individually tiltable articulated carrier members each of which has a dimension in the direction of movement of said belt which is less than the expected corresponding dimension of articles carried on said belt so that articles are supported on a successive plurality of said carrier members, and means comprising mechanism for effecting successive individual tilting of each of said carrier members to a gradually increasing degree, said mechanism having an element slopingly disposed at a predetermined location along the length of said belt, guide means, said carrier members each having a device engageable with said guide means and shiftable to engage said element to effect gradual tilting out of the plane of said belt up to a maximum degree, whereby articles are caused to be removed from said belt by progressive gravitational force, said carrier members being spaced relative to said element in the direction of belt travel so as to effect sequential tilting of at least two of said carrier members simultaneously at all times throughout the extent of said plurality of carrier members, and actuating means subject to operator control for optionally actuating said devices into engagement with said element at said predetermined location.

16. A moveable conveyor belt as set forth in claim 15, and a secondary conveyor means located adjacent said predetermined location to receive articles removed from said moveable conveyor belt.

17. A conveyor system having operator programming means and comprising a series of articulated slats effecting a belt for carrying articles spaced from each other in the direction of belt movement, means for maintaining said slats in a normally level position during the course of movement of said belt, a plurality of diverter stations disposed along said belt and respective actuating means at each such station operative to tilt said slats successively as said belt moves therepast in order to discharge articles at any selected station responsive to operator programming, control means responsive to operator programming for setting said actuating means to effect slat tilting at any selected station responsive to sensing the leading edge of an article to be discharged thereat so that when slats commence tilting at said selected station all slats passing said station are tilted by the respective actuating means regardless of the length of the article discharged at said station, said control means having elements to reset the actuating means at any such selected station responsive to sensing the leading edge of a subsequent spaced article on said belt whereby the number of slats tilted in the discharge of an article is a function of the distance between the leading edge of that article and the leading edge of the subsequent article.

References Cited by the Examiner

UNITED STATES PATENTS

| | | | |
|---|---|---|---|
| 1,270,001 | 6/1918 | Boos | 198—137 |
| 1,769,348 | 6/1930 | Krummel | 198—137 |
| 2,623,651 | 12/1952 | Vial. | |
| 2,978,092 | 4/1961 | Phillips | 198—78 |
| 3,147,845 | 9/1964 | Harrison | 198—38 |
| 3,152,681 | 10/1964 | Byrnes | 198—38 |

FOREIGN PATENTS

| | | |
|---|---|---|
| 547,931 | 6/1956 | Belgium. |
| 27,198 | 2/1955 | Finland. |
| 897,583 | 5/1962 | Great Britain. |

References Cited by the Applicant

UNITED STATES PATENTS

| | | |
|---|---|---|
| 1,868,894 | 7/1932 | Glahn. |
| 2,717,086 | 9/1955 | Bush. |
| 2,868,394 | 1/1959 | Greller. |
| 2,984,366 | 5/1961 | Greller. |

SAMUEL F. COLEMAN, *Primary Examiner.*

ERNEST A. FALLER, *Examiner.*